US007069060B2

(12) United States Patent
Kimata et al.

(10) Patent No.: US 7,069,060 B2
(45) Date of Patent: Jun. 27, 2006

(54) COMPOUND INFORMATION TERMINAL, MOBILE COMMUNICATIONS SYSTEM AND CONTROL METHOD THEREOF

(75) Inventors: Yusuke Kimata, Tokyo (JP); Masaki Ichihara, Tokyo (JP)

(73) Assignee: NEC Corporation, Tokyo (JP)

( * ) Notice: Subject to any disclaimer, the term of this patent is extended or adjusted under 35 U.S.C. 154(b) by 465 days.

(21) Appl. No.: 10/225,125

(22) Filed: Aug. 22, 2002

(65) Prior Publication Data

US 2003/0045333 A1   Mar. 6, 2003

(30) Foreign Application Priority Data

Aug. 31, 2001   (JP)   ............................. 2001-264195

(51) Int. Cl.
*H04M 1/00* (2006.01)

(52) U.S. Cl. .................................... 455/574; 455/556.1

(58) Field of Classification Search ................ 455/574, 455/404.2, 456.1, 456.2, 556.1, 127.5, 343.2, 455/343.3, 343.4
See application file for complete search history.

(56) References Cited

U.S. PATENT DOCUMENTS

| 6,141,570 | A * | 10/2000 | O'Neill et al. ............... 455/574 |
| 6,590,525 | B1 * | 7/2003 | Yule et al. .............. 342/357.06 |
| 6,799,050 | B1 * | 9/2004 | Krasner .................... 455/456.1 |
| 6,853,840 | B1 * | 2/2005 | Najafi ........................ 455/410 |

FOREIGN PATENT DOCUMENTS

| JP | H09-163450 | 6/1997 |
| JP | 2000-505976 | 5/2000 |
| WO | WO 01/41492 A | 6/2001 |

OTHER PUBLICATIONS

Japanese Office Action dated Mar. 15, 2005 (with partial English translation).

* cited by examiner

*Primary Examiner*—Erika A. Gary
(74) *Attorney, Agent, or Firm*—McGinn IP Law Group, PLLC

(57) ABSTRACT

A compound information terminal, a mobile communications system and a control method thereof, which prevent the reception on a GPS terminal unit in operation from being affected by interference without turning off a 3GPP-compliant mobile telephone unit or disabling it for transmission. The compound information terminal comprises a user interface unit, a terminal control unit, a 3GPP-compliant mobile telephone unit and a GPS terminal unit. When the GPS terminal unit is activated, the terminal control unit switches the operation of the 3GPP-compliant mobile telephone unit to the compressed mode, in which the transmission is suspended at intervals of arbitrary period of time. Accordingly, the GPS terminal unit can be brought into action while the 3GPP-compliant mobile telephone unit suspends its transmission operation. With this exclusive operation control performed between the 3GPP-compliant mobile telephone unit and GPS terminal unit, it is possible to prevent the reception on a GPS terminal from being affected by interference.

37 Claims, 11 Drawing Sheets

F I G. 8
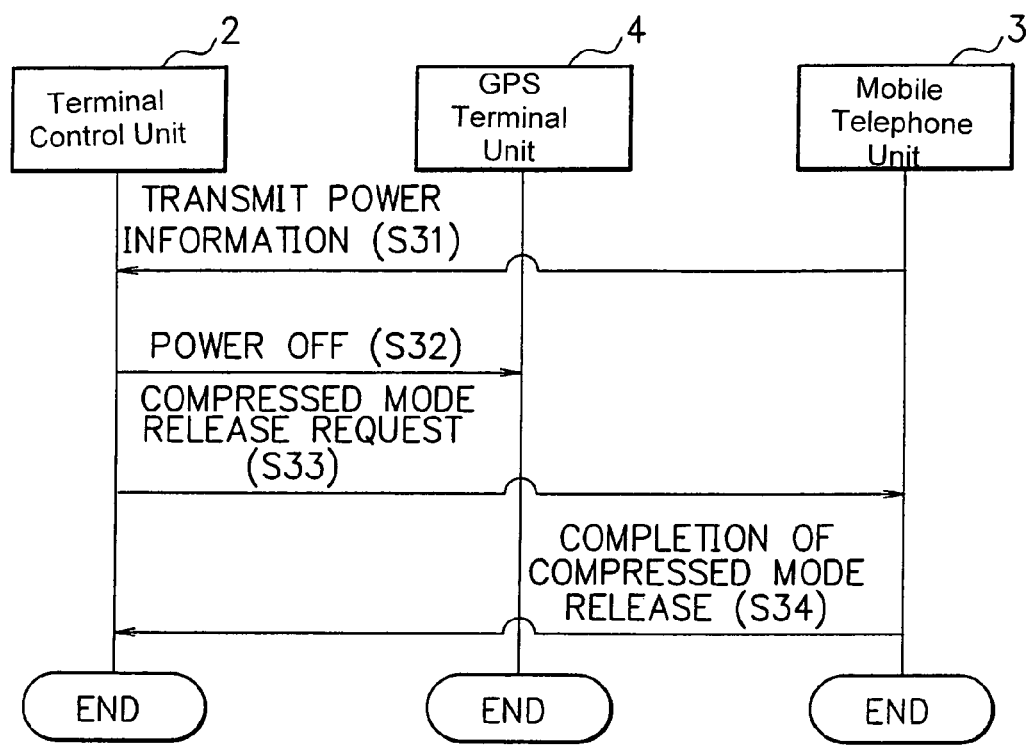
F I G. 9
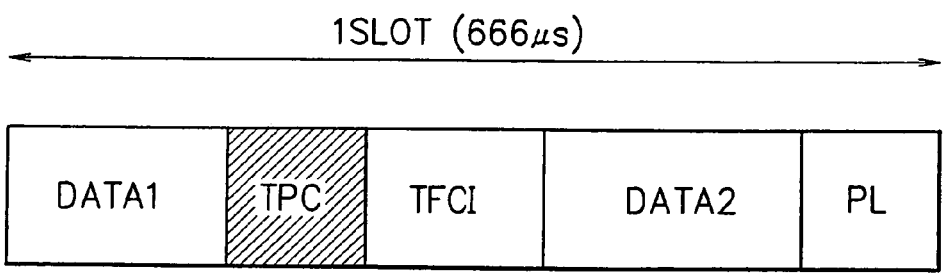
DATA1, DATA2: DATA
TPC: TRANSMIT POWER INCREASE/DECREASE REQUEST
TFCI: SLOT FORMAT, DATA RATE INFORMATION
PL: SYNCHRONIZATION SIGNAL F I G. 13
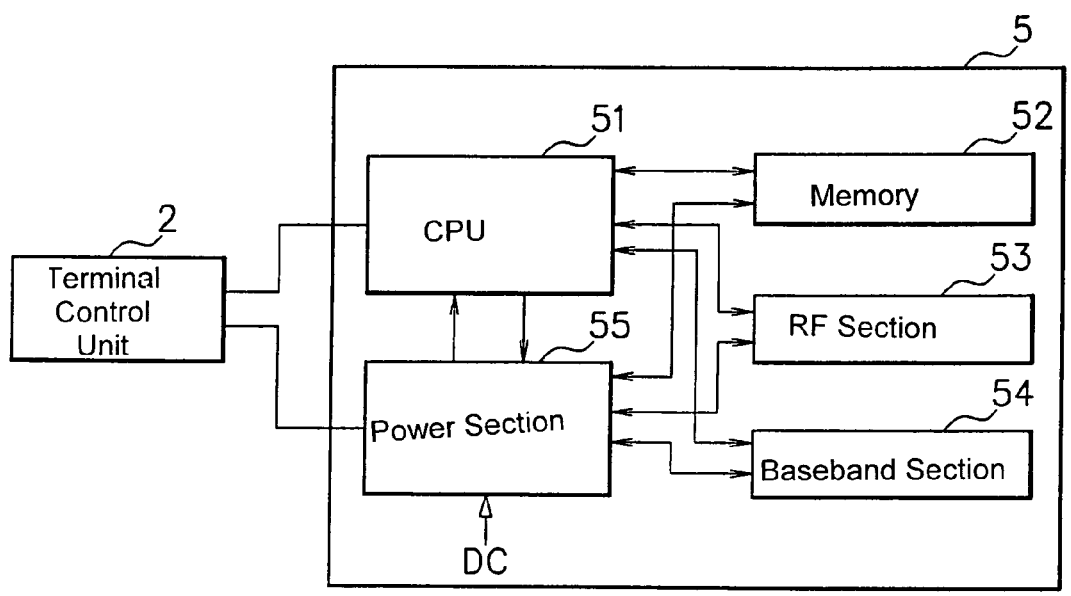

COMPOUND INFORMATION TERMINAL, MOBILE COMMUNICATIONS SYSTEM AND CONTROL METHOD THEREOF

FIELD OF THE INVENTION

The present invention relates to a compound information terminal, a mobile communications system and a control method thereof, more particularly to a compound information terminal having a built-in mobile telephone unit being compliant with standards defined by 3GPP (3rd Generation Partnership Project), a mobile communications system and a control method thereof.

BACKGROUND OF THE INVENTION

After the evolution of mobile telephones from an analog to a digital system, namely, transition from the first generation mobile telephone to the second, what is called the third-generation mobile telephone requires global standards that are recognized throughout the world. That is, there has been the growing need for the implementation of a third-generation mobile communications system, IMT-2000 (International Mobile Telecommunications 2000). 3GPP is a body organized to define the global standards for the third-generation mobile telephone. In the following description, the third-generation mobile telephone will be referred to as a 3GPP-compliant mobile telephone.

Let it be considered that the 3GPP-compliant mobile telephone is adopted in a compound information terminal comprised of an integrated combination of a mobile telephone unit and a GPS terminal unit. The GPS terminal unit is set for a low level sensitivity of less than −30 to −150 dBm. On the other hand, the maximum transmit power level of the 3GPP-compliant mobile telephone unit is, for example, greater than +24 dBm. It is difficult to attenuate the transmit power in the GPS terminal unit, and therefore the reception performance of the GPS terminal unit conceivably could be affected. In other words, it is presumed that the transmitter signal of the 3GPP-compliant mobile telephone unit has an effect on the GPS terminal unit when the units are arranged in mutual close proximity. Consequently, there is fear that the GPS terminal unit having a low received signal power level with a small resistance to interference may not function properly.

SUMMARY OF THE INVENTION

It is therefore an object of the present invention to provide a compound information terminal, in which the reception on a GPS terminal unit is undisturbed without turning off a 3GPP-compliant mobile telephone unit or disabling it for communication while the GPS terminal unit is in operation, a mobile communications system and a control method thereof.

In accordance with the first aspect of the present invention, to achieve the above object, there is provided a compound information terminal comprising a plurality of different communication units and a control unit for controlling the operation of the communication units, wherein the control unit requests one of the communication units (first communication unit) to switch to an operation mode in which its communication operation is deactivated at arbitrary time intervals, and after the first communication unit has switched to the operation mode, requests (an)other communication unit(s) to carry out communication operation while the communication operation of the first communication unit is deactivated.

In accordance with the second aspect of the present invention, in the first aspect, after the first communication unit has switched to the operation mode, the control unit turns on a power section of the other communication unit(s) while the communication operation of the first communication unit is deactivated, and turns off the power section while the first communication unit carries out the communication operation.

In accordance with the third aspect of the present invention, in the first aspect, after the first communication unit has switched to the operation mode, the control unit puts a power supply line to an RF section of the other communication unit(s) in the connected state while the communication operation of the first communication unit is deactivated, and puts the line in the disconnected state while the first communication unit carries out the communication operation.

In accordance with the fourth aspect of the present invention, in one of the first to third aspects, the compound information terminal further comprises an interface unit for receiving requests from the outside to activate/deactivate the operation of the first communication unit and/or the other communication unit(s).

In accordance with the fifth aspect of the present invention, in the fourth aspect, the control unit requests the first communication unit to switch to the operation mode on receipt of the request over the interface unit to activate the operation of the other communication unit(s).

In accordance with the sixth aspect of the present invention, in the fifth aspect, the control unit requests the first communication unit to release the operation mode on receipt of the request over the interface unit to deactivate the operation of the other communication unit(s).

In accordance with the seventh aspect of the present invention, in the fifth aspect, the control unit releases the operation mode of the first communication unit and turns off a power section thereof on receipt of the request over the interface unit to deactivate the operation of the first communication unit, and turns on the power section of the other communication unit(s).

In accordance with the eighth aspect of the present invention, in the fifth aspect, the control unit releases the operation mode of the first communication unit and breaks a power supply line to an RF section thereof on receipt of the request over the interface unit to deactivate the operation of the first communication unit, and makes the power supply line to the RF section of the other communication unit(s).

In accordance with the ninth aspect of the present invention, in one of the first to eighth aspects, the first communication unit is connected to a base station via a wireless communication network, and switches to the operation mode according to parameter information on the operation mode sent from the base station which arbitrarily sets the operation modes.

In accordance with the tenth aspect of the present invention, in one of the first to ninth aspects, the control unit is connected to the base station via the wireless communication network, and controls the operation of the other communication unit(s) according to information on transmit power sent from the base station.

In accordance with the eleventh aspect of the present invention, in one of the first to tenth aspects, the other communication unit may be a GPS terminal.

In accordance with the twelfth aspect of the present invention, there is provided a mobile communications system comprising a compound information terminal that includes a plurality of different communication units and a control unit for controlling the operation of the communication units, and a base station, wherein the compound information terminal requests the base station for permission to switch the operation of a first communication unit to an operation mode in which its communication operation is deactivated at arbitrary time intervals, the base station sends parameter information on the operation mode to the compound information terminal in response to the permission request, and after the first communication unit has switched to the operation mode according to the parameter information, the control unit of the compound information terminal makes (an)other communication unit(s) carry out communication operation while the communication operation of the first communication unit is deactivated.

In accordance with the thirteenth aspect of the present invention, in the twelfth aspect, after the first communication unit has switched to the operation mode, the control unit turns on a power section of the other communication unit(s) while the communication operation of the first communication unit is deactivated, and turns off the power section while the first communication unit carries out the communication operation.

In accordance with the fourteenth aspect of the present invention, in the twelfth aspect, after the first communication unit has switched to the operation mode, the control unit puts a power supply line to an RF section of the other communication unit(s) in the connected state while the communication operation of the first communication unit is deactivated, and puts the line in the disconnected state while the first communication unit carries out the communication operation.

In accordance with the fifteenth aspect of the present invention, in one of the twelfth to fourteenth aspects, the compound information terminal further comprises an interface unit for receiving requests from the outside to activate/deactivate the operation of the first communication unit and/or the other communication unit(s).

In accordance with the sixteenth aspect of the present invention, in the fifteenth aspect, the compound information terminal requests the base station for permission to switch the operation of the first communication unit to the operation mode on receipt of the request over the interface unit to activate the operation of the other communication unit(s).

In accordance with the seventeenth aspect of the present invention, in the fifteenth or sixteenth aspect, the compound information terminal sends a request to the base station for the cancel release of the operation mode in the first communication unit on receipt of the request over the interface unit to deactivate the operation of the other communication unit(s), the base station sends the acceptance for the cancel release of the operation mode in the first communication unit to the compound information terminal in response to the request, and after gaining the acceptance by the base station, the compound information terminal releases the operation mode in the first communication unit.

In accordance with the eighteenth aspect of the present invention, in one of the fifteenth to seventeenth aspects, the compound information terminal sends a request to the base station for the cancel release of the operation mode in the first communication unit on receipt of the request over the interface unit to deactivate the operation of the first communication units, the base station sends the acceptance for the cancel release of the operation mode in the first communication unit to the compound information terminal in response to the request, and after gaining the acceptance by the base station, the control unit turns off a power section of the first communication unit, and turns on the power section of the other communication unit(s).

In accordance with the nineteenth aspect of the present invention, in one of the fifteenth to seventeenth aspects, the control unit of the compound information terminal sends a request to the base station for the cancel release of the operation mode in the first communication unit on receipt of the request over the interface unit to deactivate the operation of the first communication unit, the base station sends the acceptance for the cancel release of the operation mode in the first communication unit to the compound information terminal in response to the request, and after gaining the acceptance by the base station, the control unit breaks a power supply line to an RF section of the first communication unit, and makes the power supply line to the RF section of the other communication unit(s).

In accordance with the twentieth aspect of the present invention, in one of the twelfth to nineteenth aspects, the control unit controls the operation of the other communication unit(s) according to information on transmit power sent from the base station.

In accordance with the twenty-first aspect of the present invention, in one of the twelfth to twentieth aspects, the other communication unit may be a GPS terminal.

In accordance with the twenty-second aspect of the present invention, there is provided a method for controlling a compound information terminal that includes a plurality of different communication units and a control unit for controlling the operation of the communication units, comprising the steps of receiving requests from the outside to activate/deactivate the operation of a first communication unit and/or (an)other communication unit(s) (reception step), requesting the first communication unit to switch to an operation mode in which its communication operation is deactivated at arbitrary time intervals on receipt of the request to activate the operation of the other communication unit(s) at the reception step (request step), switching the operation of the first communication unit to the operation mode according to the request made at the request step (switch step), and after the first communication unit has switched to the operation mode at the switch step, controlling the other communication unit(s) to carry out communication operation while the communication operation of the first communication unit is deactivated (control step).

In accordance with the twenty-third aspect of the present invention, in the twenty-second aspect, after the first communication unit has switched to the operation mode at the switch step, the control unit turns on a power section of the other communication unit(s) while the communication operation of the first communication unit is deactivated, and turns off the power section while the first communication unit carries out the communication operation at the control step.

In accordance with the twenty-fourth aspect of the present invention, in the twenty-second aspect, after the first communication unit has switched to the operation mode at the switch step, the control unit puts a power supply line to an RF section of the other communication unit(s) in the connected state while the communication operation of the first communication unit is deactivated, and puts the line in the disconnected state while the first communication unit carries out the communication operation at the control step.

In accordance with the twenty-fifth aspect of the present invention, in one of the twenty-second to twenty-fourth aspects, the control method further comprises the step of releasing the operation mode in the first communication unit on receipt of the request to deactivate the operation of the other communication unit(s) at the reception step (cancel release step).

In accordance with the twenty-sixth aspect of the present invention, in the twenty-fifth aspect, after releasing the operation mode at the cancel release step on receipt of the request to deactivate the operation of the first communication unit at the reception step, the control unit turns off a power section of the first communication unit, and turns on a power section of the other communication unit(s) at the control step.

In accordance with the twenty-seventh aspect of the present invention, in the twenty-fifth aspect, after releasing the operation mode at the cancel release step on receipt of the request to deactivate the operation of the first communication unit at the reception step, the control unit breaks a power supply line to an RF section of the first communication unit, and makes the power supply line to the RF section of the other communication unit(s) at the control step.

In accordance with the twenty-eighth aspect of the present invention, in one of the twenty-second to twenty-seventh aspects, the control unit switches the operation of the first communication unit to the operation mode at the switch step according to parameter information on the operation mode sent from a base station, which is connected to the first communication unit via a wireless communication network and arbitrarily sets operation modes.

In accordance with the twenty-ninth aspect of the present invention, in the twenty-eighth aspect, the control method further includes the step of determining whether or not to switch the operation of the other communication unit(s) according to transmit power information sent from the base station (determination step), and the control unit controls the operation of the other communication unit(s) based on the determination made at the determination step.

In accordance with the thirtieth aspect of the present invention, there is provided a method for controlling a mobile communications system comprising a compound information terminal that includes a plurality of different communication units and a control unit for controlling the operation of the communication units, and a base station, comprising a reception step in which the compound information terminal receives requests from the outside to activate/deactivate the operation of a first communication unit and/or (an)other communication unit(s), a first transmission step in which the compound information terminal sends a request to the base station for permission to switch the operation of the first communication unit to an operation mode for deactivating its communication operation at arbitrary time intervals, a second transmission step in which the base station sends parameter information on the operation mode to the compound information terminal in response to the permission request made at the first transmission step, a switch step in which the compound information terminal switches the operation of the first communication unit to the operation mode according to the parameter information obtained at the second transmission step, and a control step in which the compound information terminal makes the other communication unit(s) carry out communication operation while the communication operation of the first communication unit is deactivated after having been switched to the operation mode at the switch step.

In accordance with the thirty-first aspect of the present invention, in the thirtieth aspect, a power section of the other communication unit(s) is turned on while the communication operation of the first communication unit is deactivated, and turned off while the first communication unit carries out the communication operation at the control step.

In accordance with the thirty-second aspect of the present invention, in the thirtieth aspect, a power supply line to an RF section of the other communication unit(s) is put in the connected state while the communication operation of the first communication unit is deactivated, and in the disconnected state while the first communication unit carries out the communication operation at the control step.

In accordance with the thirty-third aspect of the present invention, in one of the thirtieth to thirty-second aspects, the control method further comprises a third transmission step in which the compound information terminal sends a request to the base station for the cancel release of the operation mode in the first communication unit on receipt of the request from the outside to deactivate the operation of the other communication unit(s) at the reception step, a fourth transmission step in which the base station sends the acceptance for the cancel release of the operation mode in the first communication unit to the compound information terminal in response to the request made at the third transmission step, and a cancel release step in which after receiving the acceptance from the base station, the compound information terminal releases the operation mode in the first communication unit.

In accordance with the thirty-fourth aspect of the present invention, in one of the thirtieth to thirty-third aspects, the control method further comprises a fifth transmission step in which the compound information terminal sends a request to the base station for the cancel release of the operation mode in the first communication unit on receipt of the request from the outside to deactivate the operation of the first communication unit at the reception step, and a sixth transmission step in which the base station sends the acceptance for the cancel release of the operation mode in the first communication unit to the compound information terminal in response to the request made at the fifth transmission step. After receiving the acceptance from the base station, the compound information terminal releases the operation mode in the first communication unit at the cancel release step.

In accordance with the thirty-fifth aspect of the present invention, in the thirty-third or thirty-fourth aspect, after releasing the operation mode at the cancel release step, the compound information terminal turns off a power section of the first communication unit, and turns on a power section of the other communication units.

In accordance with the thirty-sixth aspect of the present invention, in the thirty-third or thirty-fourth aspect, after releasing the operation mode at the cancel release step, the compound information terminal breaks a power supply line to an RF section of the first communication unit, and makes the power supply line to the RF section of the other communication unit(s).

In accordance with the thirty-seventh aspect of the present invention, in one of the thirtieth to thirty-sixth aspects, the control method further includes a determination step in which the compound information terminal determines whether or not to switch the operation of the other communication unit(s) according to transmit power information sent from the base station, and the control unit controls the operation of the other communication unit(s) based on the determination made at the determination step.

In accordance with the present invention, a compound information terminal comprised of an integrated combination of a 3GPP-compliant mobile telephone unit and a GPS terminal unit is provided with a built-in terminal control unit. The terminal control unit controls the operation of the units in such a manner as to switch the 3GPP-compliant mobile telephone unit to a compressed mode in which its transmission operation is suspended for a certain period of time when activating the GPS terminal unit. Consequently, the GPS terminal unit carried on operation while the 3GPP-compliant mobile telephone unit suspends the transmission operation, and thus enabling the GPS terminal unit to be free of adverse influence caused by placing the 3GPP-compliant mobile telephone unit close to the GPS terminal unit.

BRIEF DESCRIPTION OF THE DRAWINGS

The objects and features of the present invention will become more apparent from the consideration of the following detailed description taken in conjunction with the accompanying drawings in which:

FIG. 8 is a sequence chart showing the second example operation of the compound information terminal according to the embodiment of the present invention;

FIG. 9 is a diagram showing a request for an increase/decrease in transmit power (1 slot) sent from the 3GPP-compliant base station;

FIG. 13 is a schematic block diagram showing the configuration of a Bluetooth terminal unit depicted in FIG. 12;

DESCRIPTION OF THE PREFERRED EMBODIMENTS

Figure 1:
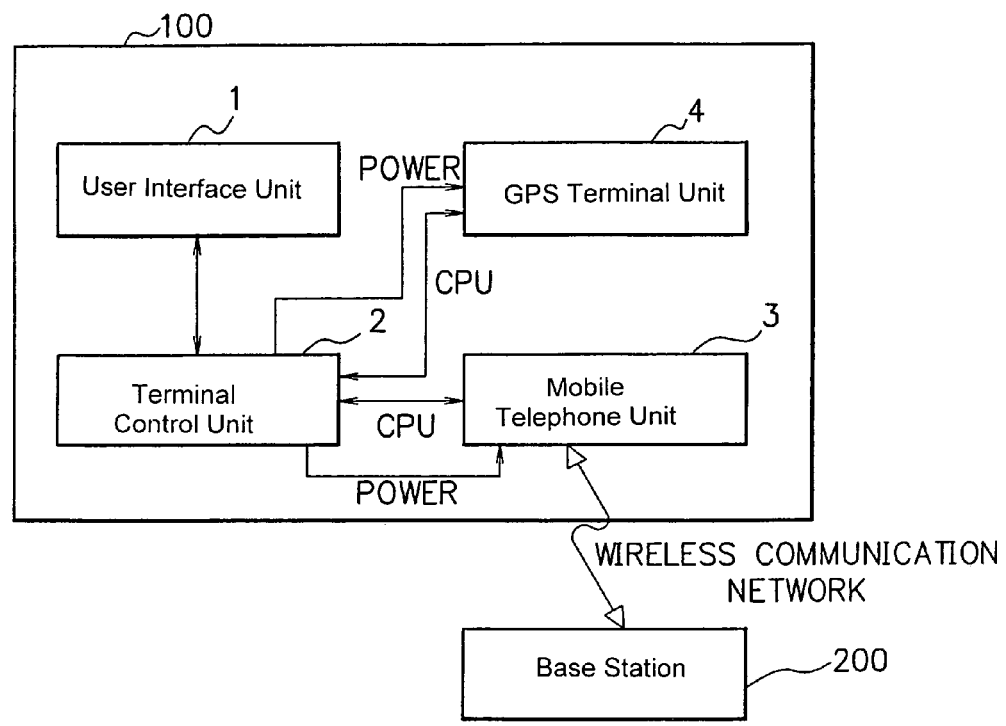
FIG. 1 is a schematic block diagram showing the configuration of a compound information terminal and a mobile communication system according to an embodiment of the present invention.

Referring now to the drawings, a description of preferred embodiments of the present invention will be given in detail.

FIG. 1 is a schematic block diagram showing the configuration of a mobile communication system and a compound information terminal 100 included therein according to the first embodiment of the present invention. Referring to FIG. 1, the compound information terminal 100 comprises a user interface unit 1, a terminal control unit 2, a 3GPP-compliant mobile telephone unit 3, and a GPS terminal unit 4. The 3GPP-compliant mobile telephone unit 3 is connected to a 3GPP-compliant base station 200 via a wireless communication network, and thus forming the mobile communication system.

The user interface unit 1 includes operation keys (10-key, symbol keys, etc) for inputting instructions from a user, a liquid crystal display such as TFT (Thin Film Transistor)-LCD, TFD (Thin Film Diode)-LCD, etc. or an organic EL (electro luminescent) display for providing the user with information, and the like. The user communicates interactively with the compound information terminal 100 via the user interface unit 1.

The user inputs an instruction to use the 3GPP-compliant mobile telephone unit 3 or the GPS terminal unit 4 through the user interface unit 1. The user interface unit 1 sends the instruction to the terminal control unit 2. The terminal control unit 2 sets the 3GPP-compliant mobile telephone unit 3 in the compressed mode for suspending the transmission operation of the unit 3 for a certain period of time. The GPS terminal unit 4 performs communication operation while the 3GPP-compliant mobile telephone unit 3 is suspending its transmission operation under the control of the terminal control unit 2.

The compressed mode is a standard defined by 3GPP. In the compressed mode, the 3GPP-compliant mobile telephone unit 3 periodically suspends the transmission operation. At the same time, the 3GPP-compliant base station 200 turns off the transmission to the 3GPP-compliant mobile telephone unit 3. The maximum idle length or transmission gap is defined to be 14 slots (1 slot: 666 μs) in 2 frames (1 frame: 10 ms): 7 slots per a 10 ms frame. During the transmission gap, the 3GPP-compliant base station 200 signals information on other frequencies and radio access technologies such as GSM (Global System for Mobile Communications), etc. to the 3GPP-compliant mobile telephone unit 3. Thereby the 3GPP-compliant mobile telephone unit 3 performs measurements of received power and the like. There is found a description of the compressed mode in "3GPP TS 25.125 V3.6.0, March 2001 ".

The present invention takes advantage of the transmission gap to control the 3GPP-compliant mobile telephone unit 3 and the GPS terminal unit 4 so that both the units do not operate simultaneously.

Figure 2:
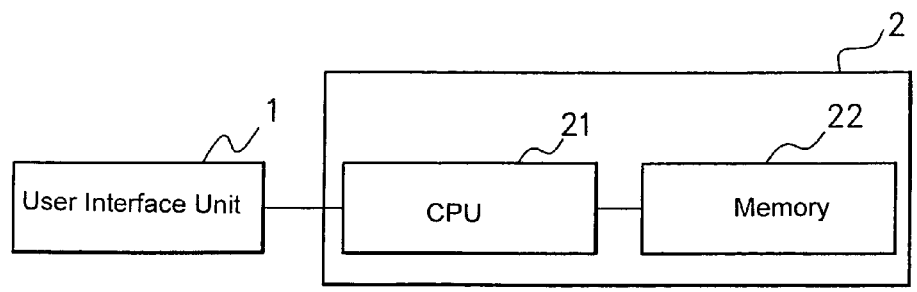
FIG. 2 is a schematic block diagram showing the configuration of a terminal control unit depicted in FIG. 1.

FIG. 2 is a schematic block diagram showing the configuration of the terminal control unit 2. As can be seen in FIG. 2, the terminal control unit 2 includes a CPU 21 and a memory 22. The CPU 21 processes instructions from the user interface unit 1, 3GPP-compliant mobile telephone unit 3, and GPS terminal unit 4, and controls the operation of the 3GPP-compliant mobile telephone unit 3 and/or GPS terminal unit 4 while fetching information (operation control program, etc.) corresponding to inputted instructions from the memory 22.

Figure 3:
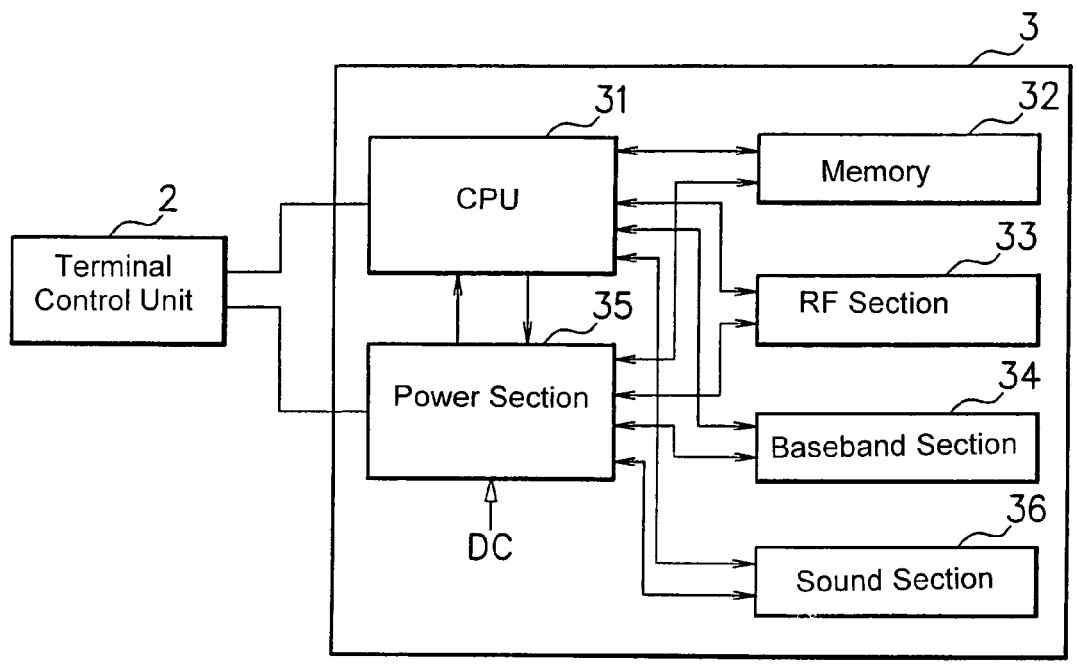
FIG. 3 is a schematic block diagram showing the configuration of a 3GPP-compliant mobile telephone unit depicted in FIG. 1.

FIG. 3 is a schematic block diagram showing the configuration of the 3GPP-compliant mobile telephone unit 3. As shown in FIG. 3, the 3GPP-compliant mobile telephone unit 3 includes a CPU 31, a memory 32, an RF section 33, a baseband section 34, a power section 35, and a sound section 36.

The CPU 31 processes instructions and signals from the RF section 33, baseband section 34, power section 35, and sound section 36 or the terminal control unit 2 as well as controlling the operation of the RF section 33, baseband section 34, power section 35, and sound section 36 while fetching information (operation control program, etc.) corresponding to the instruction of the terminal control unit 2 from the memory 32. The RF section 33 for treating radio signals is configured with an antenna, a filter, a signal amplifier, a modulator-demodulator, a PLL (phase-locked loop) synthesizer, and the like. The baseband section 34 is configured with a DSP (digital signal processor), etc. and performs digital signal processing defined by 3GPP. In the power section 35, on/off switch control is executed with respect to the whole or partial power to the 3GPP-compliant mobile telephone unit 3 according to instructions from the CPU 31 or the terminal control unit 2. The sound section 36 that treats user's voice is configured with a speaker, a microphone, a DSP for coding/decoding audio signals, and the like.

Figure 4:
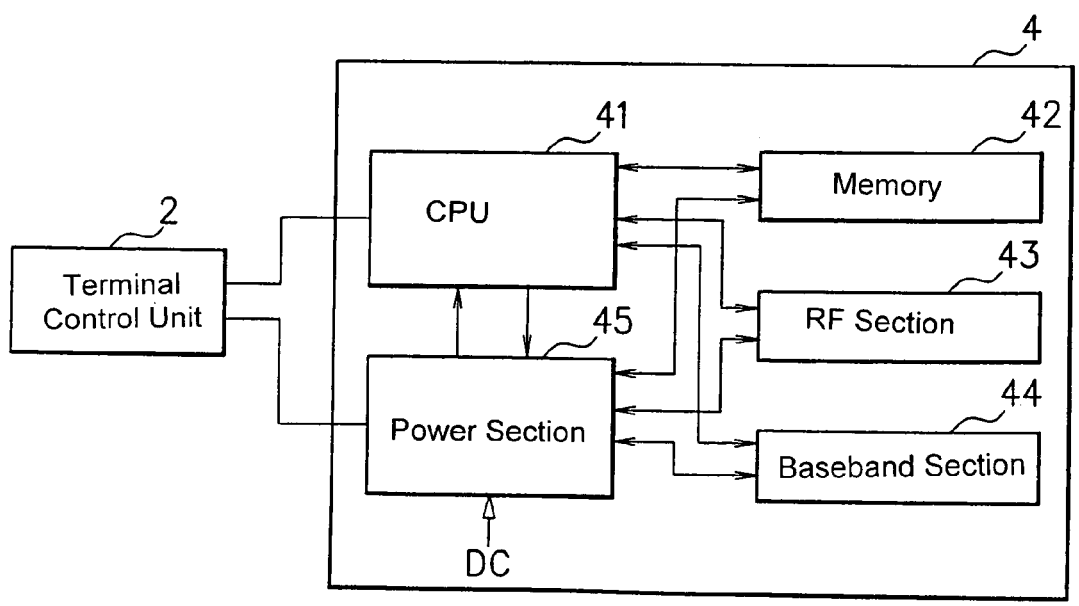
FIG. 4 is a schematic block diagram showing the configuration of a GPS terminal unit depicted in FIG. 1.

FIG. 4 is a schematic block diagram showing the configuration of the GPS terminal unit 4. As shown in FIG. 4, the GPS terminal unit 4 includes a CPU 41, a memory 42, an RF section 43, a baseband section 44, and a power section 45.

The CPU 41 processes instructions and signals from the RF section 43, baseband section 44, and power section 45 or the terminal control unit 2 as well as controlling the operation of the RF section 43, baseband section 44, and power section 45 while fetching information (operation control program, etc.) corresponding to the instruction of the terminal control unit 2 from the memory 42. The RF section 43 for treating radio signals is configured with an antenna, a filter, a signal amplifier, a modulator-demodulator, a PLL synthesizer, and the like. The baseband section 44 is configured with a DSP, etc. and performs digital signal processing. In the power section 45, on/off switch control is executed with respect to the whole or partial power to the GPS terminal unit 4 according to instructions from the CPU 41 or the terminal control unit 2.

Incidentally, while the power section 35 or 45 is turned on/off based on instructions from the terminal control unit 2 in the configuration illustrated in FIGS. 3 and 4, transmission operation may be suspended differently. For example, a signal path to the RF section 33 or 43 may be brought into the disconnected state by using a switching element, etc. (not shown) so that the RF section is deactivated, or is set to the transmission impossible state so as not to transmit signals.

In this configuration, it is supposed that the 3GPP-compliant mobile telephone unit 3 is capable of compressed mode control.

First Mode of Operation

Figure 5:
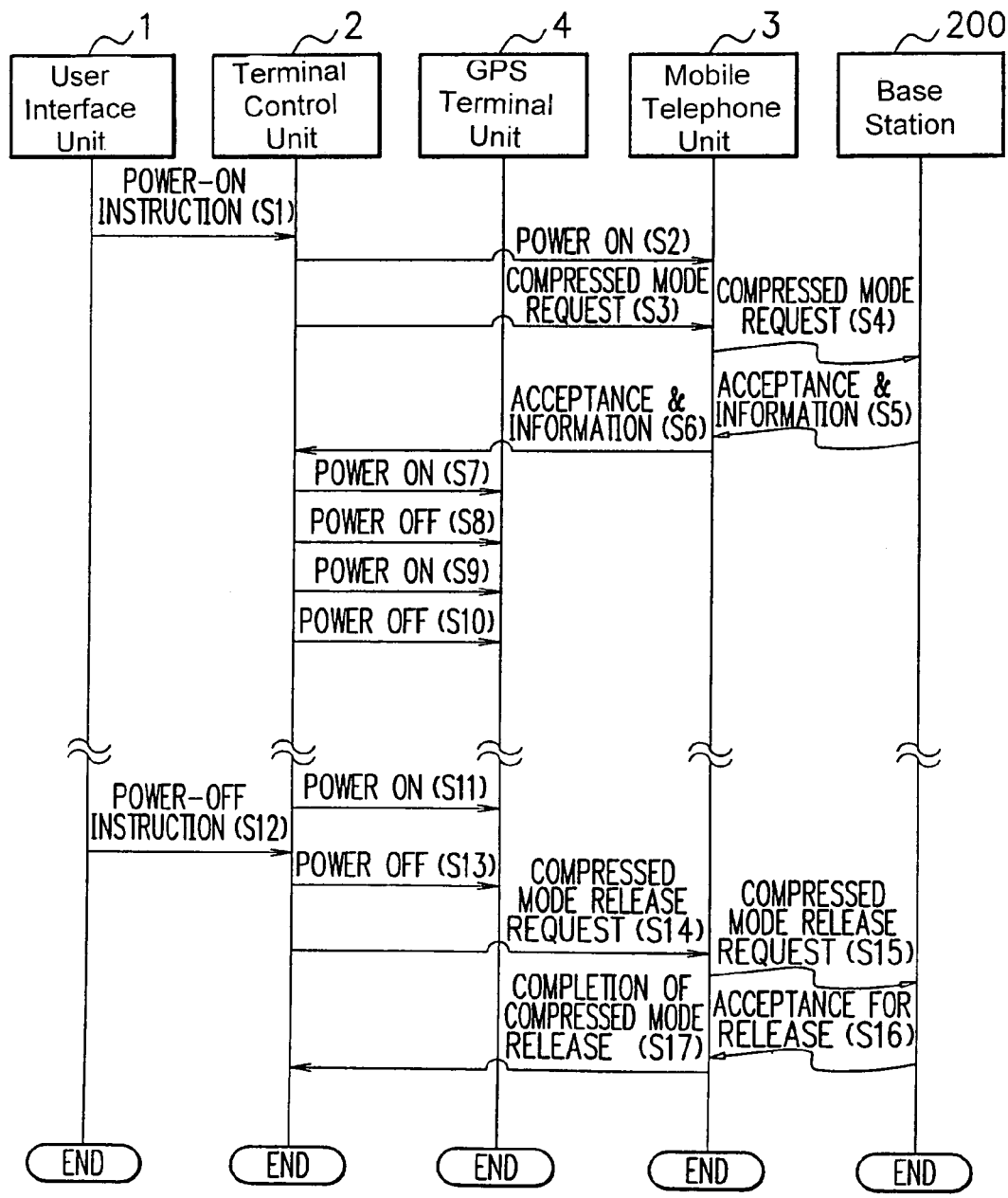
FIG. 5 is a sequence chart showing the first example operation of the compound information terminal according to the embodiment of the present invention.

FIG. 5 is a sequence chart showing the first example operation of the compound information terminal 100 according to the first embodiment of the present invention. First, a user inputs instructions to the terminal control unit 2 to turn on the 3GPP-compliant mobile telephone unit 3 and GPS terminal unit 4 by using the user interface unit 1 (step S1).

On receipt of the power-on instructions from the user interface unit 1, the terminal control unit 2 sets the 3GPP-compliant mobile telephone unit 3 to the power-on state (step S2), and subsequently requests the unit 3 to enter the compressed mode (step S3).

Having received the compressed mode request from the terminal control unit 2, the 3GPP-compliant mobile telephone unit 3 forwards the compressed mode request to the 3GPP-compliant base station 200 (step S4).

There are three types of compressed mode: UL compressed mode for turning off the transmission from the unit 3 to the base station 200, DL compressed mode for turning off the transmission from the base station 200 to the unit 3, and UL/DL compressed mode for turning off the transmission of both the unit 3 and base station 200. The compressed mode requested of the base station 200 by the unit 3 at step S4 is the UL compressed mode or UL/DL compressed mode.

When receiving the compressed mode request from the 3GPP-compliant mobile telephone unit 3, the 3GPP-compliant base station 200 accepts a switch to the compressed mode, and signals to the unit 3 various parameters as compressed mode information (step S5).

The 3GPP-compliant mobile telephone unit 3, which has received the acceptance and the parameters (compressed mode information) from the 3GPP-compliant base station 200, forwards the acceptance and the compressed mode information (necessary parameters only) to the terminal control unit 2 (step S6).

The compressed mode information includes the following fifteen parameters:
1. TGSN (Transmission Gap Starting Slot Number);
2. TGL 1 (Transmission Gap Length 1);
3. TGL 2 (Transmission Gap Length 2);
4. TGD (Transmission Gap Start Distance);
5. TGPL 1 (Transmission Gap Pattern Length 1);
6. TGPL 2 (Transmission Gap Pattern Length 2);
7. TGPRC (Transmission Gap Pattern Repetition Count);
8. TGCFN (Transmission Gap Connection Frame Number);
9. UL/DL compressed mode selection;
10. UL compressed mode method;
11. DL compressed mode method;
12. downlink frame type;
13. scrambling code change;
14. RPP (Recovery Period Power); and
15. ITP (Initial Transmit Power).

The 3GPP-compliant mobile telephone unit 3 feeds the terminal control unit 2 with eight parameters 1 to 8: TGSN, TGL 1, TGL 2, TGD, TGPL 1, TGPL 2, TGPRC, and TGCFN. Seven parameters 9 to 15 are not sent to the unit 2.

The parameters that the 3GPP-compliant base station 200 has signaled to the 3GPP-compliant mobile telephone unit 3 as the compressed mode information are received at the RF section 33. Then, after undergoing signal amplification/demodulation at the RF section 33 and signal processing at the baseband section 34, the parameters are extracted. The CPU 31 is fed with the fifteen parameters. Next, the CPU 31 fetches instructions corresponding to the parameters from the memory 32, and appropriately controls the RF section 33 and baseband section 34.

The settings of these parameters are determined by the 3GPP-compliant base station 200. In the settings, it is necessary that the "UL/DL compressed mode selection" is set to the UL compressed mode or UL/DL compressed mode in order to prevent the reception on the GPS terminal unit 4 from being affected by transmitter signals from the 3GPP-compliant mobile telephone unit 3.

Figure 6:
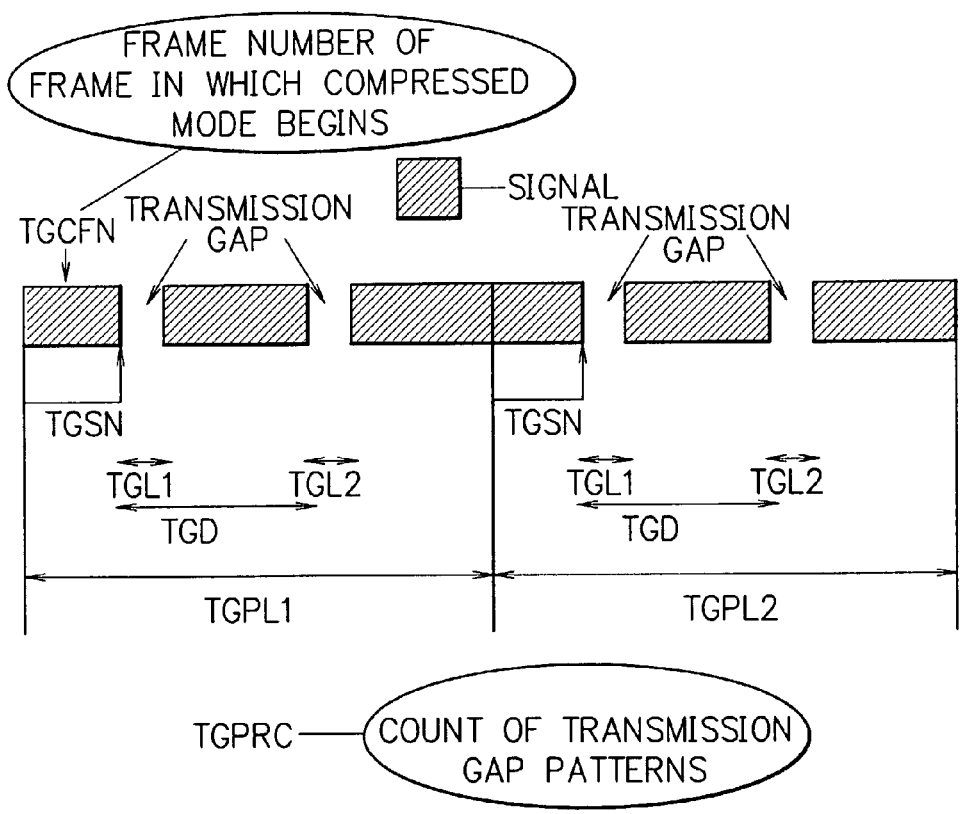
FIG. 6 is a diagram showing compressed mode information (parameters) sent from the 3GPP-compliant mobile telephone unit.

FIG. 6 is a diagram showing the compressed mode information sent from the 3GPP-compliant mobile telephone unit 3 to the terminal control unit 2. Referring to FIG. 6, the compressed mode information includes eight parameters (TGSN, TGL 1, TGL 2, TGD, TGPL 1, TGPL 2, TGPRC, and TGCFN). As is described above, while the 3GPP-compliant base station 200 sends the 3GPP-compliant mobile telephone unit 3 the compressed mode information of fifteen parameters, the unit 3 feeds the terminal control unit 2 with eight parameters that have been extracted through the signal amplification/demodulation at the RF section 33 and the signal processing at the baseband section 34. In the following, the eight parameters will be described in detail.

TGSN is the number of slots in a frame, in which a transmission gap pattern begins, from the start of a transmission gap pattern until the 3GPP-compliant mobile telephone unit 3 stops the transmission.

TGL 1 and TGL 2 indicate the period from when the unit 3 stops the transmission until it recommences the transmission, that is, the duration of the transmission gap, expressed in,number of slots.

TGD is the period from when the unit 3 stops the transmission until it stops the transmission again, that is, the duration between the beginnings of two consecutive transmission gaps, expressed in number of slots.

TGPL 1 and TGPL 2 indicate the duration of transmission gap pattern in which the unit 3 stops and recommences the transmission according to the aforementioned parameters (TGSN, TGL 1, TGL 2, TGD, etc.), expressed in number of frames.

TGPRC is the number of transmission gap patterns within the transmission gap pattern sequence.

TGCFN is the frame number of the frame in which the compressed mode begins.

The terminal control unit 2 gives the GPS terminal unit 4 instructions to switch on/off power with reference to the eight parameters (steps S7 to S11). In this embodiment, TGPRC is set to the infinite number of times, and the power on/off instructions from the terminal control unit 2 to the GPS terminal unit 4 repeat infinitely in principle unless, for example, otherwise instructed by the user.

When the user inputs an instruction to turn off the GPS terminal unit 4 by using the user interface unit 1, the unit 1 sends the power-off instruction to the terminal control unit 2 (step S12). On receipt of the power-off instruction from the user interface unit 1, the terminal control unit 2 forwards the power-off instruction to the GPS terminal unit 4 if the unit 4 is in the on state (step S13). When the GPS terminal unit 4 is in off state, the terminal control unit 2 does not send the instruction.

Subsequently, the terminal control unit 2 makes a request to the 3GPP-compliant mobile telephone 3 for the cancel release of the compressed mode (step S14).

Having received the compressed mode release request from the terminal control unit 2, the 3GPP-compliant mobile telephone 3 requests the 3GPP-compliant base station 200 to release the compressed mode (step S15).

Accordingly, the 3GPP-compliant base station 200 releases the compressed mode, and switches the operation of the 3GPP-compliant mobile telephone unit 3 to the normal mode, in which the unit 3 does not periodically suspend the transmission for a certain length of time. Then, the 3GPP-compliant base station 200 sends acceptance for the cancel release of the compressed mode (step S16). When receiving the acceptance from the 3GPP-compliant base station 200, the 3GPP-compliant mobile telephone unit 3 informs the terminal control unit 2 of the completion of the compressed mode release (step S17).

Figure 7:
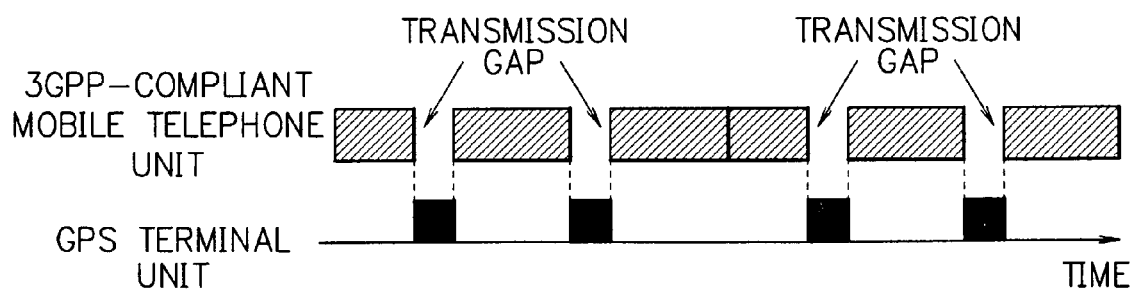
FIG. 7 is a distribution map showing signal processing time in the 3GPP-compliant mobile telephone unit and GPS terminal unit.

FIG. 7 is a distribution map showing signal processing time in the 3GPP-compliant mobile telephone unit and GPS terminal unit according to the first mode of operation in the first embodiment of the present invention. As can be seen in FIG. 7, while in the compressed mode, signal processing of the GPS terminal unit 4 is carried out during the transmission gaps in the 3GPP-compliant mobile telephone unit 3.

Second Mode of Operation

The second mode of operation differs from the first mode in that while in the compressed mode, the terminal control unit 2 turns off the GPS terminal unit 4 and requests the 3GPP-compliant mobile telephone unit 3 to release the compressed mode when the compressed mode causes the degradation of transmitter signals of the unit 3.

FIG. 8 is a flowchart showing the second mode of operation performed by the compound information terminal 100 according to the first embodiment of the present invention. In the following, a description will be given of the second mode of operation based on the assumption that the 3GPP-compliant mobile telephone unit 3 is in the compressed mode, and the terminal control unit 2 is performing power on/off control for the GPS terminal unit 4 according to the compressed mode information.

In FIG. 8, the 3GPP-compliant mobile telephone unit 3 informs the terminal control unit 2 of transmit power information including a current transmit power value and TPC (Transmit Power Control) information sent from the 3GPP-compliant base station 200 (step S31). The current transmit power value is determined by the voltage that is fed from the power section 36 to the amplifier in the RF section 33 by the CPU 31.

As shown in FIG. 9, the TPC information is a request to increase/decrease transmit power (per slot) sent from the 3GPP-compliant base station 200 to the 3GPP-compliant mobile telephone unit 3. In the 3GPP-compliant mobile telephone unit 3, the TPC information (parameter) is extracted and fed to the CPU 31 after having been demodulated at the RF section 33. When the parameter value is 1, the TPC information represents a request to increase transmit power. When 0 or −1, it represent a request to maintain or decrease transmit power, respectively.

In the case where the 3GPP-compliant base station 200 continually requests for further increase in transmit power a certain number of times even when the current transmit power of the 3GPP-compliant mobile telephone unit 3 shows a maximum value, the terminal control unit 2 holds the GPS terminal unit 4 off (step S32).

Subsequently, the terminal control unit 2 requests the 3GPP-compliant mobile telephone unit 3 to release the compressed mode (step S33). The 3GPP-compliant mobile telephone unit 3 releases the compressed mode, and informs the terminal control unit 2 of the completion of the compressed mode release (step S34).

Figure 10:
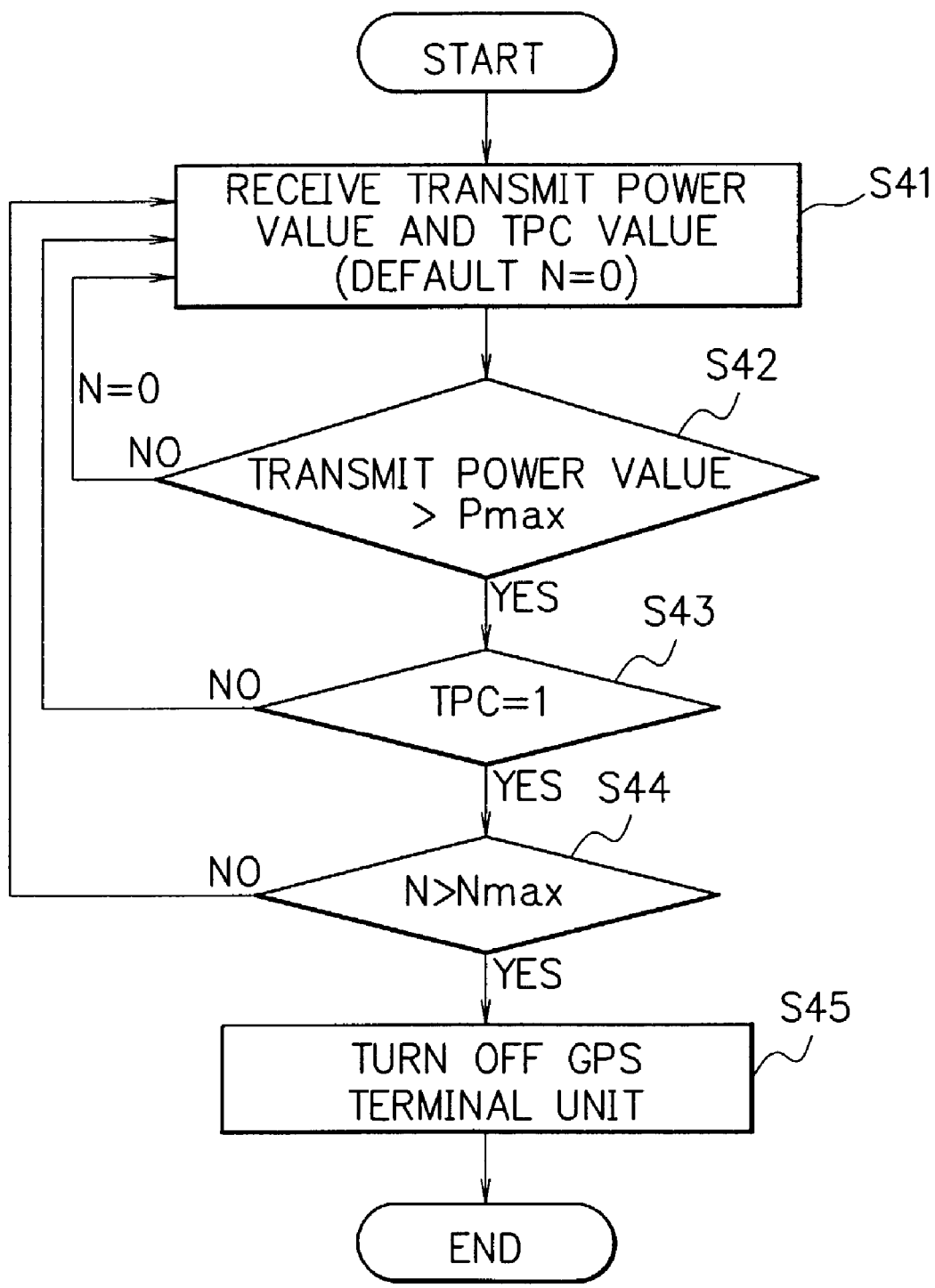
FIG. 10 is a flowchart showing the example process performed by the terminal control unit in the second example operation.

FIG. 10 is a flowchart showing the example process performed when the terminal control unit 2 holds the GPS terminal unit 4 off in the second mode of operation.

The terminal control unit 2 increments N (N++) each time it receives the transmit power information (current transmit power value and TPC information) form the 3GPP-compliant mobile telephone unit 3; the initial value of N is set at zero (default N=0) at the start of the compressed mode (step S41). After that, the terminal control unit 2 compares the current transmit power value with a predetermined maximum transmit power value Pmax (step S42).

When the current transmit power value≦Pmax at step S42, N is reset to the initial value (N=0), and the process returns to step S41. On the other hand, when the transmit power value>Pmax, the terminal control unit 2 checks the TPC information (step S43).

When TPC=−1 or 0 at step S43, the process returns to step S41. On the other hand, when TPC=1, the terminal control unit 2 compares N with a predetermined maximum count Nmax of requests to increase transmit power (step S44).

When N≦Nmax at step S44, the process returns to step S41. On the other hand, when N>Nmax, the terminal control unit 2 holds the GPS terminal unit 4 off (step S45).

Third Mode of Operation

The third mode of operation is carried out when the user inputs an instruction to turn off the 3GPP-compliant mobile telephone unit 3 through the user interface unit 1 while the unit 3 is in the compressed mode. In this case, the terminal control unit 2 turns off the 3GPP-compliant mobile telephone unit 3 after releasing the compressed mode. The third mode of operation differs from the first mode in that the terminal control unit 2 keeps the GPS terminal unit 4 on since there is no possibility that the transmitter signal of the 3GPP-compliant mobile telephone unit 3 affects the received signal of the unit 4.

Figure 11:
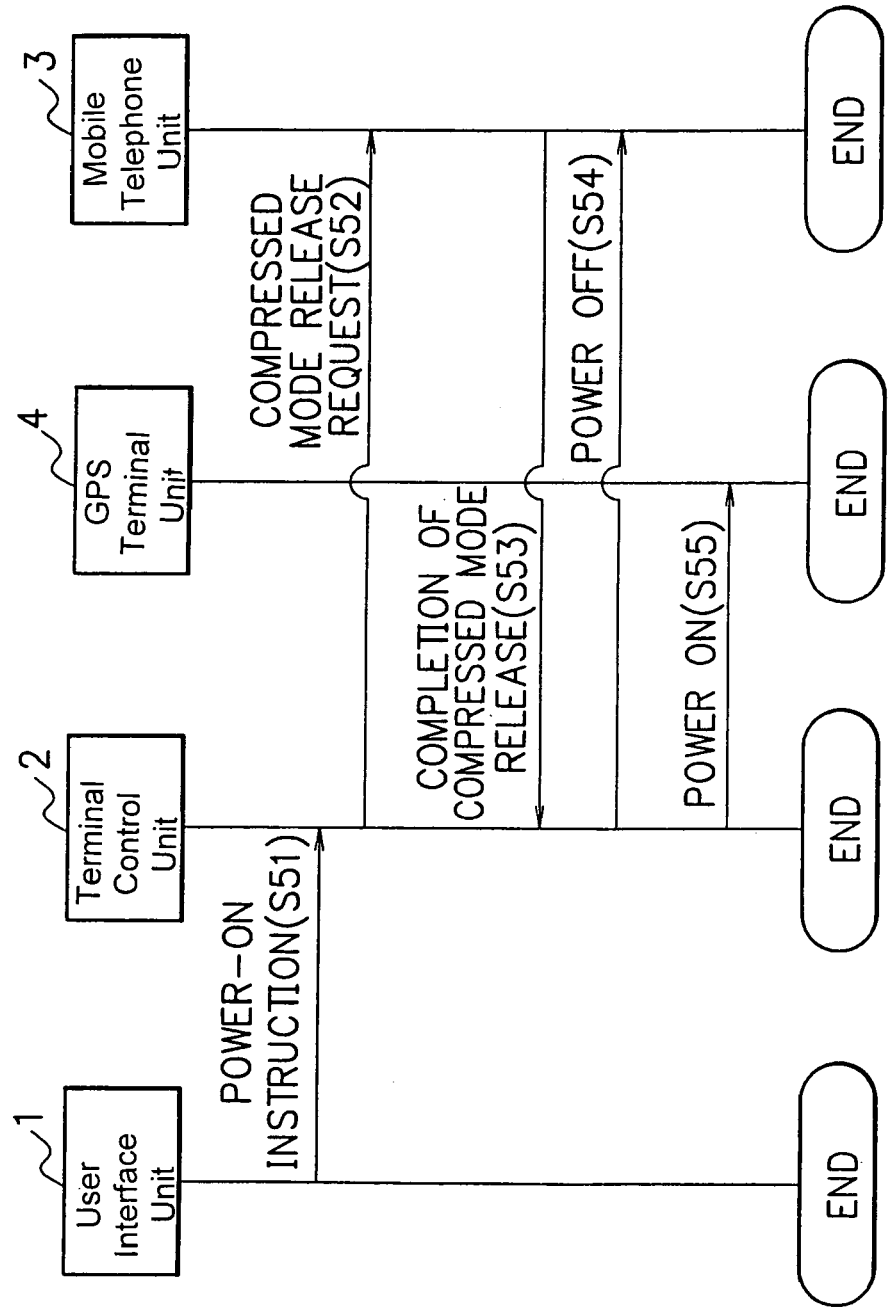
FIG. 11 is a sequence chart showing the third example operation of the compound information terminal according to the embodiment of the present invention.

FIG. 11 is a sequence chart showing the third mode of operation performed by the compound information terminal 100 according to the first embodiment of the present invention. First the user instructs the terminal control unit 2 to turn off the 3GPP-compliant mobile telephone unit 3 by using the user interface unit 1 (step S51).

The terminal control unit 2 requests the 3GPP-compliant mobile telephone unit 3 to release the compressed mode (step S52).

The 3GPP-compliant mobile telephone unit 3 releases the compressed mode, and informs the terminal control unit 2 of the completion of the compressed mode release (step S53).

The terminal control unit 2 set the 3GPP-compliant mobile telephone unit 3 off (step S54), and holds the GPS terminal unit 4 on (step S55).

Figure 12:
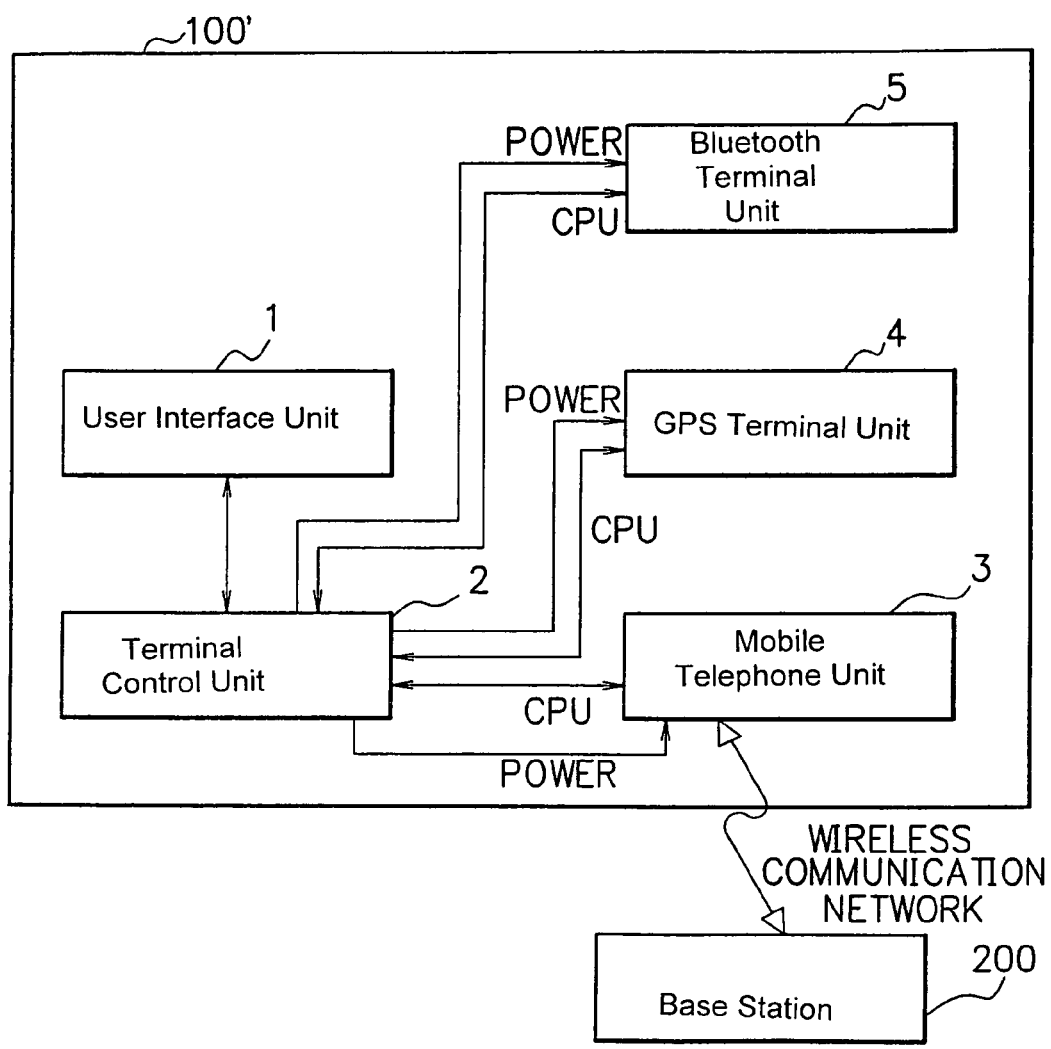
FIG. 12 is a schematic block diagram showing the configuration of a compound information terminal and a mobile communication system according to another embodiment of the present invention.

FIG. 12 is a schematic block diagram showing the configuration of a compound information terminal 100' and a mobile communication system according to the second embodiment of the present invention. Referring to FIG. 12, the compound information terminal 100' of the second embodiment includes a Bluetooth terminal unit 5 in addition to the configuration of the compound information terminal 100 in the first embodiment. Incidentally, the same components are designated by similar numerals, and do not require further explanation.

The CPU 21 of the terminal control unit 2 processes instructions from the user interface unit 1, 3GPP-compliant mobile telephone unit 3, GPS terminal unit 4, and Bluetooth terminal unit 5, and controls the operation of the units 3, 4 and 5 while fetching information (operation control program, etc.) corresponding to inputted instructions from the memory 22.

The Bluetooth is a local wireless communication technology employing frequency-hopping spread spectrum communication, which Ericsson, IBM, Intel Corp., Nokia, and Toshiba Corp. have attempted to standardize. In the Bluetooth, data such as audio data and asynchronous data are transmitted at a transmission rate of 1Mbps in an area of 10 cm to 10 m (extendable up to 100 m) by using the 2.4 GHz frequency band (79 channels per 1 MHz). The Bluetooth defines lower layers such as an RF circuit, a baseband signal processing circuit, etc. and middleware or a protocol stack including L2CAP (Logical Link Control Adaptation Protocol), RFCOMM (RF Communications Protocol), SDP (Service Discovery Protocol), OBEX (Object Exchange Protocol), and the like. The Bluetooth terminal unit 5 enables a point-to-multipoint connection as well as a peer-to-peer connection (one-to-one connection) between a mobile telephone and a personal computer, portable information device, etc. or an access point (base station) by using the Bluetooth technology.

FIG. 13 is a schematic block diagram showing the configuration of the Bluetooth terminal unit 5 according to the second embodiment of the present invention. As shown in FIG. 13, the Bluetooth terminal unit 5 includes a CPU 51, a memory 52, an RF section 53, a baseband section 54, and a power section 55.

The CPU 51 processes instructions and signals from the RF section 53, baseband section 54 and power section 55, or the terminal control unit 2 as well as controlling the RF section 53, baseband section 54 and power section 55 while fetching information corresponding to the instructions from the memory 52. The RF section 53 for treating radio signals is configured with an antenna, a filter, a signal amplifier, a modulator-demodulator, a PLL (phase-locked loop) synthesizer, and the like. The baseband section 54 is configured with a DSP, etc. and performs digital signal processing defined by the Bluetooth. In the power section 55, on/off switch control is executed with respect to the whole or partial power to the Bluetooth terminal unit 5 according to instructions from the CPU 51 or the terminal control unit 2.

Incidentally, while the power section 55 is turned on/off based on instructions from the terminal control unit 2 in the configuration illustrated in FIG. 13, the transmission operation may be suspended differently. For example, a signal path to the RF section 53 may be put into the disconnected state by using a switching element, etc. (not shown) so that the RF section is deactivated, or is set to the transmission impossible state so as not to transmit signals.

Figure 14:
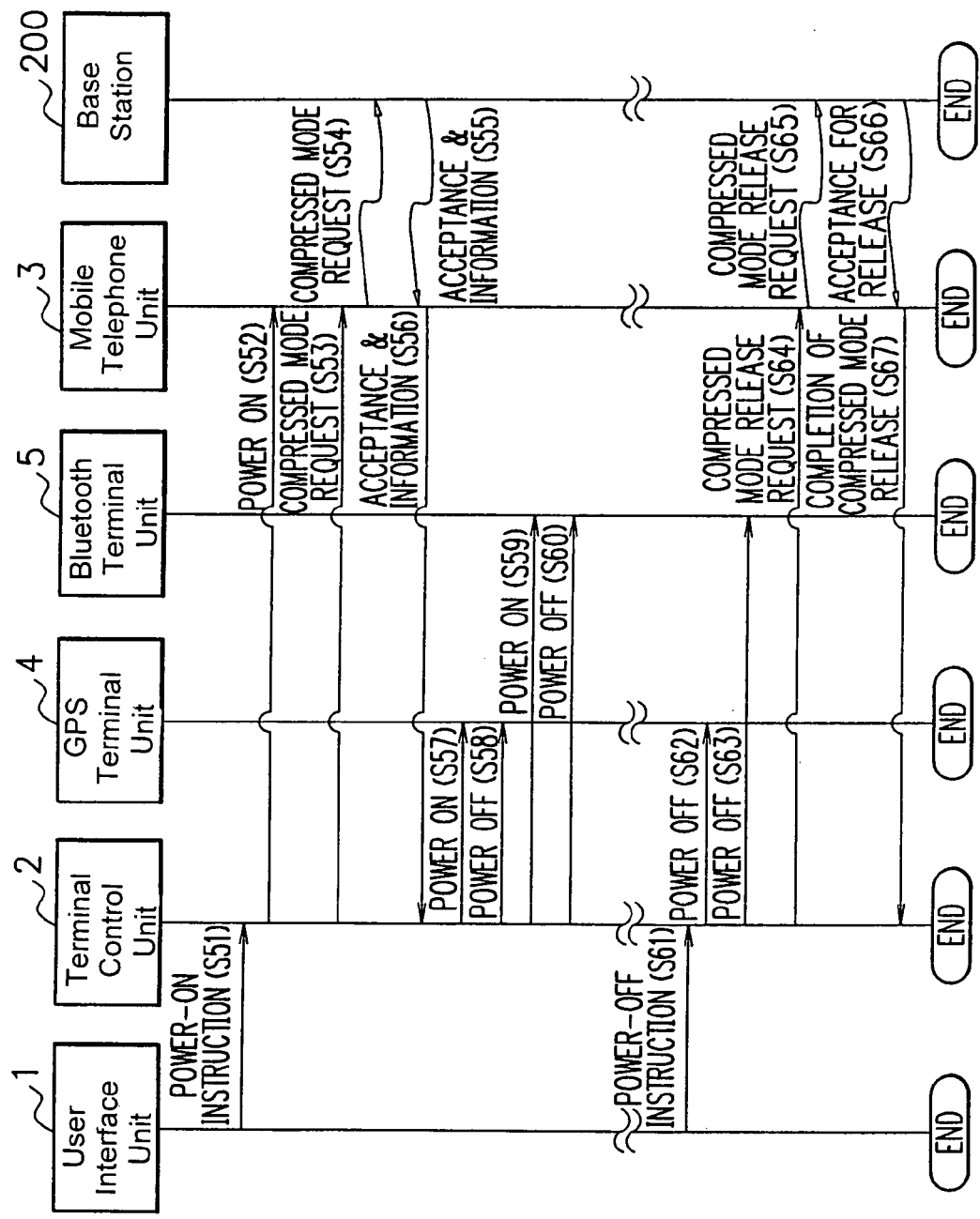
FIG. 14 is a sequence chart showing the example operation of the compound information terminal according to the other embodiment of the present invention.

FIG. 14 is a flowchart showing the example operation of the compound information terminal 100' according to the second embodiment of the present invention. First, a user inputs instructions to the terminal control unit 2 to turn on the 3GPP-compliant mobile telephone unit 3, GPS terminal unit 4 and Bluetooth terminal unit 5 through the user interface unit 1 (step S51).

On receipt of the power-on instructions from the user interface unit 1, the terminal control unit 2 turns on the 3GPP-compliant mobile telephone unit 3 (step S52), and requests the unit 3 to enter the compressed mode (step S53).

Having received the compressed mode request from the terminal control unit 2, the 3GPP-compliant mobile telephone unit 3 forwards the compressed mode request to the 3GPP-compliant base station 200 (step S54).

When receiving the compressed mode request from the 3GPP-compliant mobile telephone unit 3, the 3GPP-compliant base station 200 accepts a switch to the compressed mode, and signals to the unit 3 various parameters as compressed mode information (step S55).

The 3GPP-compliant mobile telephone unit 3, which has received the acceptance and the parameters (compressed mode information) from the 3GPP-compliant base station 200, forwards the acceptance and the compressed mode information to the terminal control unit 2 (step S56).

The terminal control unit 2 gives the GPS terminal unit 4 instructions to switch on/off power with reference to the eight parameters received as compressed mode information (steps S57 and S58). Besides, the terminal control unit 2 gives the Bluetooth terminal unit 5 instructions to switch on/off power (steps S59 and S60). While the Bluetooth terminal unit 5 is turned on after the GPS terminal unit 4 in the above description, the unit 5 may be turned on precedently. The order may be changed based on arbitrary settings through the user interface unit 1.

Besides, the GPS terminal unit 4 uses 1.5 GHz frequency band, while the Bluetooth terminal unit uses 2.4 GHz frequency band. Therefore, even when both the units are brought into operation at the same time, the reception on the GPS terminal unit 5 is not affected. Consequently, it is possible that the terminal control unit 2 turns on the GPS terminal unit 4 and Bluetooth terminal unit 5 simultaneously, or turns on one after the other.

In this embodiment, TGPRC is set to the infinite number of times in the same manner as described above in connection with FIG. 5, and the power on/off instructions from the terminal control unit 2 to the GPS terminal unit 4 and Bluetooth terminal unit 5 repeat infinitely in principle unless, for example, otherwise instructed by the user.

When the user inputs an instruction to turn off the GPS terminal unit 4 or Bluetooth terminal unit 5 through the user interface unit 1, the unit 1 sends the power-off instruction to the terminal control unit 2 (step S61).

On receipt of the power-off instruction from the user interface unit 1, the terminal control unit 2 forwards the power-off instruction to the GPS terminal unit 4/Bluetooth terminal unit 5 if the unit 4/5 is in the on state (steps S62 and S63). When the GPS terminal unit 4/Bluetooth terminal unit 5 is in off state, the terminal control unit 2 does not send the instruction.

Subsequently, the terminal control unit 2 makes a request to the 3GPP-compliant mobile telephone 3 for the cancel release of the compressed mode (step S64).

Having received the compressed mode release request from the terminal control unit 2, the 3GPP-compliant mobile telephone 3 requests the 3GPP-compliant base station 200 to release the compressed mode (step S65).

Accordingly, the 3GPP-compliant base station 200 releases the compressed mode, and switches the operation of the 3GPP-compliant mobile telephone 3 to the normal mode, in which the unit 3 does not periodically suspend the transmission for a certain length of time. Then, the 3GPP-compliant base station 200 sends acceptance for the cancel release of the compressed mode (step S66). When receiving the acceptance from the 3GPP-compliant base station 200, the 3GPP-compliant mobile telephone unit 3 informs the terminal control unit 2 of the completion of the compressed mode release (step S67).

Figure 15:
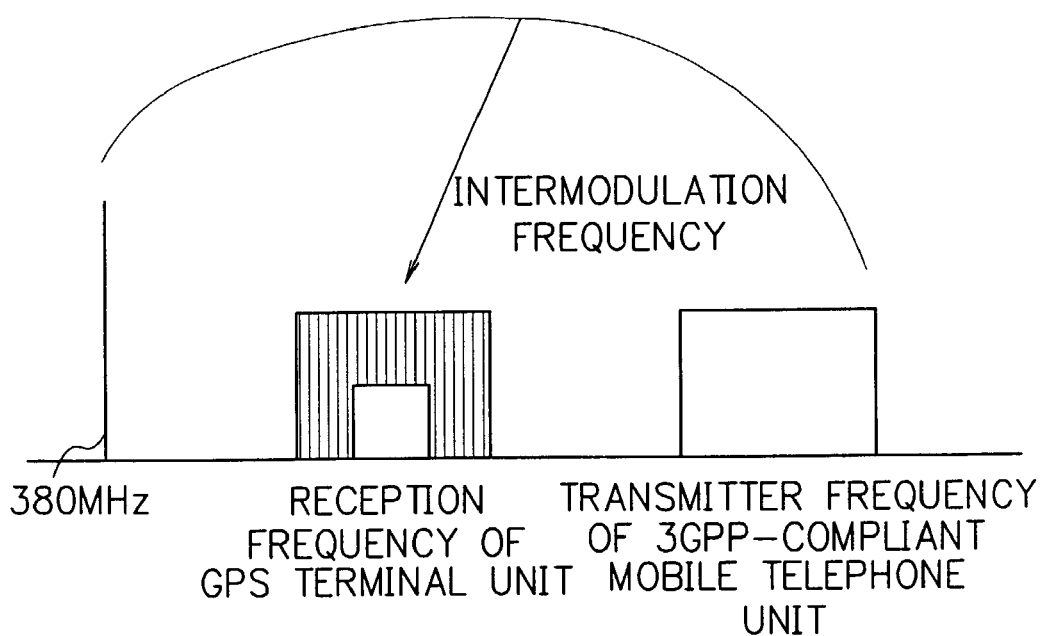
FIG. 15 is a diagram showing effects of intermodulation frequency on the reception on the GPS terminal unit.

FIG. 15 is a diagram showing effects of intermodulation frequency on the reception on the GPS terminal unit 4. When the 3GPP-compliant mobile telephone unit is adopted in a compound information terminal comprised of an integrated combination of a mobile telephone unit and a GPS terminal unit, there exist internal frequencies due to an intermediate frequency signal and a VCO (Voltage-Controlled Oscillator) output signal in addition to the transmit frequency of the 3GPP-compliant mobile telephone unit. The intermodulation of two signals of different frequencies generates a signal that becomes interference on the GPS terminal unit. Consequently, there is fear that the GPS terminal unit having a low received signal power level with a small resistance to interference may not function properly.

Referring to FIG. 15, in the compound information terminal, there exist the transmit frequency fc (1920 to 1980 MHz) of the 3GPP-compliant mobile telephone unit and internal frequency (380 MHz). In addition, when the intermodulation of these two frequencies occurs, there is created a signal at a frequency that is the difference between the two (fc−380=1540 to 1600 MHz). As a result, the signal conceivably becomes interference in the frequency (1570.31 to 1580.54 MHz) of the GPS terminal unit, and affects the reception thereof.

According to the present invention, however, in a compound information terminal comprising a 3GPP-compliant mobile telephone unit and a GPS terminal unit, both the units are not activated simultaneously through the use of the compressed mode of the 3GPP-compliant mobile telephone unit. That is, by virtue of exclusive operation control, either the units is always set to the off state. Thus, it is possible to prevent the generation of interference on the GPS terminal unit caused by the intermodulation of the transmit frequency of the 3GPP-compliant mobile telephone and internal frequency.

Although the present invention has been described in its preferred embodiments, such a description is for illustrative purposes only. It is to be understood that changes and variations can be made without departing from the spirit or the scope of the present invention. For example, the compressed mode information (parameters) may be previously stored in a ROM etc. (not shown) in the terminal control unit. In this case, the terminal control unit fetches the compressed mode information from the ROM based on instructions inputted through the user interface unit, and carries out operation mode switch process to switch the operation of the 3GPP-compliant mobile telephone unit to an operation mode in which transmission is periodically suspended for a certain length of time.

Additionally, the compound information terminal may include some terminal unit other than or in addition to the GPS terminal unit and Bluetooth terminal unit.

As set forth hereinabove, in accordance with the present invention, the 3GPP-compliant mobile telephone unit and can be activated exclusively by taking advantage of the compressed mode of the 3GPP-compliant mobile telephone unit. Consequently, it is possible to prevent the 3GPP-compliant mobile telephone unit from affecting the reception on the GPS terminal unit without turning off the telephone unit or disabling it for transmission.

Moreover, when the compressed mode causes the degradation of transmitter signals of the 3GPP-compliant mobile telephone unit, the compressed mode is released. Accordingly, the degradation of transmitter signals can be avoided.

Furthermore, under the exclusive operation control performed between the GPS terminal unit and 3GPP-compliant mobile telephone unit by using the compressed mode, the GPS terminal unit can be automatically turned on every time the mobile telephone unit is turned off.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A mobile communications system, comprising:
    a compound information terminal that includes a plurality of different communication units and a control unit for controlling an operation of the communication units, and a base station, wherein:
    the compound information terminal requests the base station for permission to switch the operation of a first communication unit to an operation mode in which its communication operation is deactivated at arbitrary time intervals;
    the base station sends parameter information on the operation mode to the compound information terminal in response to the permission request; and
    after the first communication unit has switched to the operation mode according to the parameter information, the control unit makes one or more other communication units carry out a communication operation while the communication operation of the first communication unit is deactivated.

2. The mobile communications system claimed in claim 1, wherein:
after the first communication unit has switched to the operation mode, the control unit turns on a power section of the one or more other communication units while the communication operation of the first communication unit is deactivated, and turns off the power section while the first communication unit carries out the communication operation.

3. The mobile communications system claimed in claim 1, wherein:
after the first communication unit has switched to the operation mode, the control unit puts a power supply line to a radio frequency (RF) section of the one or more other communication units in a connected state while the communication operation of the first communication unit is deactivated, and puts the line in a disconnected state while the first communication unit carries out the communication operation.

4. The mobile communications system claimed in claim 1, wherein:
the control unit controls the operation of the one or more other communication units according to information on transmit power sent from the base station.

5. The mobile communications system claimed in claim 4, wherein:
the compound information terminal includes a global positioning system (GPS) terminal as the one or more other communication unit.

6. The mobile communications system claimed in claim 1, wherein:
the compound information terminal includes a global positioning system (GPS) terminal as the one or more other communication unit.

7. A mobile communications system, comprising:
a compound information terminal that includes a plurality of different communication units, a control unit for controlling an operation of the communication units and an interface unit for receiving requests from outside to activate/deactivate the operation of at least one of a first communication unit and one or more other communication units, and a base station, wherein:
the compound information terminal requests the base station for permission to switch the operation of a first communication unit to an operation mode in which its communication operation is deactivated at arbitrary time intervals;
the base station sends parameter information on the operation mode to the compound information terminal in response to the permission request; and
after the first communication unit has switched to the operation mode according to the parameter information, the control unit makes the one or more other communication units carry out a communication operation while the communication operation of the first communication unit is deactivated.

8. The mobile communications system claimed in claim 7, wherein:
the control unit controls the operation of the one or more other communication units according to information on transmit power sent from the base station.

9. The mobile communications system claimed in claim 7, wherein:
the compound information terminal includes a global positioning system (GPS) terminal as the one or more other communication unit.

10. A mobile communications system, comprising:
a compound information terminal that includes a plurality of different communication units, a control unit for controlling an operation of the communication units and an interface unit for receiving requests from outside to activate/deactivate the operation of at least one of a first communication unit and one or more other communication units, and a base station, wherein:
the compound information terminal requests the base station for permission to switch the operation of the first communication unit to an operation mode on receipt of the request over the interface unit to activate the operation of the one or more other communication units;
the base station sends parameter information on the operation mode to the compound information terminal in response to the permission request; and
after the first communication unit has switched to the operation mode according to the parameter information, the control unit makes the one or more other communication units carry out a communication operation while the communication operation of the first communication unit is deactivated.

11. The mobile communications system claimed in claim 10, wherein:
the compound information terminal sends a request to the base station for a cancel release of the operation mode in the first communication unit on receipt of the request over the interface unit to deactivate the operation of the one or more other communication units;
the base station sends an acceptance for the cancel release of the operation mode in the first communication unit to the compound information terminal in response to the request; and
after receiving the acceptance from the base station, the control unit releases the operation mode in the first communication unit.

12. The mobile communications system claimed in claim 11, wherein:
the control unit controls the operation of the one or more other communication units according to information on transmit power sent from the base station.

13. The mobile communications system claimed in claim 11, wherein:
the compound information terminal includes a global positioning system (GPS) terminal as the one or more other communication unit.

14. The mobile communications system claimed in claim 10, wherein:
the compound information terminal sends a request to the base station for a cancel release of the operation mode in the first communication unit on receipt of the request over the interface unit to deactivate the operation of the first communication units;
the base station sends an acceptance for the cancel release of the operation mode in the first communication unit to the compound information terminal in response to the request; and
after receiving the acceptance from the base station, the control unit turns off a power section of the first communication unit, and turns on a power section of the one or more other communication units.

15. The mobile communications system claimed in claim 14, wherein:
the control unit controls the operation of the one or more other communication units according to information on transmit power sent from the base station.

16. The mobile communications system claimed in claim 14, wherein:
the compound information terminal includes a global positioning system (GPS) terminal as the one or more other communication unit.

17. The mobile communications system claimed in claim 10, wherein:
the compound information terminal sends a request to the base station for a cancel release of the operation mode in the first communication unit on receipt of the request over the interface unit to deactivate the operation of the first communication unit;
the base station sends an acceptance for the cancel release of the operation mode in the first communication unit to the compound information terminal in response to the request; and
after receiving the acceptance from the base station, the control unit breaks a power supply line to a radio frequency (RF) section of the first communication unit, and makes a power supply line to an RF section of the one or more other communication units.

18. The mobile communications system claimed in claim 17, wherein:
the control unit controls the operation of the one or more other communication units according to information on transmit power sent from the base station.

19. The mobile communications system claimed in claim 17, wherein:
the compound information terminal includes a global positioning system (GPS) terminal as the one or more other communication unit.

20. The mobile communications system claimed in claim 10, wherein:
the control unit controls the operation of the one or more other communication units according to information on transmit power sent from the base station.

21. The mobile communications system claimed in claim 10, wherein:
the compound information terminal includes a global positioning system (GPS) terminal as the one or more other communication unit.

22. A method for controlling a mobile communications system comprising a compound information terminal that includes a plurality of different communication units and a control unit for controlling an operation of the communication units, and a base station, comprising:
a reception step in which the compound information terminal receives requests from outside to activate/deactivate the operation of at least one of a first communication unit and one or more other communication units;
a first transmission step in which the compound information terminal sends a request to the base station for permission to switch the operation of the first communication unit to an operation mode for deactivating its communication operation at arbitrary time intervals;
a second transmission step in which the base station sends parameter information on the operation mode to the compound information terminal in response to the permission request made at the first transmission step;
a switch step in which the compound information terminal switches the operation of the first communication unit to the operation mode according to the parameter information obtained at the second transmission step; and
a control step in which the compound information terminal makes the one or more other communication units carry out a communication operation while the communication operation of the first communication unit is deactivated after having been switched to the operation mode at the switch step.

23. The method for controlling a mobile communications system claimed in claim 22, wherein:
at the control step a power section of the one or more other communication units is turned on while the communication operation of the first communication unit is deactivated, and turned off while the first communication unit carries out the communication operation.

24. The method for controlling a mobile communications system claimed in claim 22, wherein:
at the control step, a power supply line to a radio frequency (RF) section of the one or more other communication units is put in a connected state while the communication operation of the first communication unit is deactivated, and in a disconnected state while the first communication unit carries out the communication operation.

25. The method for controlling a mobile communications system claimed in claim 22, further comprising:
a third transmission step in which the compound information terminal sends a request to the base station for a cancel release of the operation mode in the first communication unit on receipt of the request from the outside to deactivate the operation of the one or more other communication units at the reception step;
a fourth transmission step in which the base station sends an acceptance for the cancel release of the operation mode in the first communication unit to the compound information terminal in response to the request made at the third transmission step; and
a cancel release step in which after receiving the acceptance from the base station, the compound information terminal releases the operation mode in the first communication unit.

26. The method for controlling a mobile communications system claimed in claim 25, further comprising:
a fifth transmission step in which the compound information terminal sends a request to the base station for a cancel release of the operation mode in the first communication unit on receipt of the request from the outside to deactivate the operation of the first communication unit at the reception step; and
a sixth transmission step in which the base station sends an acceptance for the cancel release of the operation mode in the first communication unit to the compound information terminal in response to the request made at the fifth transmission step; and wherein:
after receiving the acceptance from the base station, the compound information terminal releases the operation mode in the first communication unit at the cancel release step.

27. The method for controlling a mobile communications system claimed in claim 26, wherein:
after releasing the operation mode at the cancel release step, the compound information terminal turns off a power section of the first communication unit, and turns on a power section of the one or more other communication units.

28. The method for controlling a mobile communications system claimed in claim 26, wherein:
after releasing the operation mode at the cancel release step, the compound information terminal breaks a power supply line to a radio frequency (RF) section of the first communication unit, and makes a power supply line to an RF section of the one or more other communication units.

29. The method for controlling a mobile communications system claimed in claim 26, further including:
a determination step in which the compound information terminal determines whether to switch the operation of the one or more other communication units according to transmit power information sent from the base station; and wherein:
at the control step, the control unit controls the operation of the one or more other communication units based on the determination result made at the determination step.

30. The method for controlling a mobile communications system claimed in claim 25, wherein:
after releasing the operation mode at the cancel release step, the compound information terminal turns off a power section of the first communication unit, and turns on a power section of the one or more other communication units.

31. The method for controlling a mobile communications system claimed in claim 25, wherein:
after releasing the operation made at the cancel release step, the compound information terminal breaks a power supply line to a radio frequency (RF) section of the first communication unit, and makes a power supply line to an RF section of the one or more other communication units.

32. The method for controlling a mobile communications system claimed in claim 25, further including:
a determination step in which the compound information terminal determines whether to switch the operation of the one or more other communication units according to transmit power information sent from the base station; and wherein:
at the control step, the control unit controls the operation of the one or more other communication units based on the determination result made at the determination step.

33. The method for controlling a mobile communications system claimed in claim 22, further comprising:
a fifth transmission step in which the compound information terminal sends a request to the base station for a cancel release of the operation mode in the first communication unit on receipt of the request from the outside to deactivate the operation of the first communication unit at the reception step; and
a sixth transmission step in which the base station sends an acceptance for the cancel release of the operation mode in the first communication unit to the compound information terminal in response to the request made at the fifth transmission step; and wherein;
after receiving the acceptance from the base station, the compound information terminal releases the operation mode in the first communication unit at the cancel release step.

34. The method for controlling a mobile communications system claimed in claim 33, wherein:
after releasing the operation mode at the cancel release step, the compound information terminal turns off a power section of the first communication unit, and turns on a power section of the one or more other communication units.

35. The method for controlling a mobile communications system claimed in claim 33, wherein:
after releasing the operation mode at the cancel release step, the compound information terminal breaks a power supply line to a radio frequency (RF) section of the first communication unit, and makes a power supply line to an RF section of the one or more other communication units.

36. The method for controlling a mobile communications system claimed in claim 33, further including:
a determination step in which the compound information terminal determines whether to switch the operation of the one or more other communication units according to transmit power information sent from the base station; and wherein:
at the control step, the control unit controls the operation of the one or more other communication units based on the determination result made at the determination step.

37. The method for controlling a mobile communications system claimed in claim 22, further including:
a determination step in which the compound information terminal determines whether to switch the operation of the one or more other communication units according to transmit power information sent from the base station; and wherein:
at the control step, the control unit controls the operation of the one or more other communication units based on the determination result made at the determination step.

* * * * *